US012760762B2

(12) United States Patent
Okano

(10) Patent No.: US 12,760,762 B2
(45) Date of Patent: Oct. 13, 2026

(54) HALF THRUST BEARING

(71) Applicant: DAIDO METAL COMPANY LTD., Nagoya (JP)

(72) Inventor: Shinji Okano, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 129 days.

(21) Appl. No.: 18/786,654

(22) Filed: Jul. 29, 2024

(65) Prior Publication Data

US 2025/0043816 A1 Feb. 6, 2025

(30) Foreign Application Priority Data

Jul. 31, 2023 (JP) ................................ 2023-124273

(51) Int. Cl.
*F16C 9/02* (2006.01)

(52) U.S. Cl.
CPC ..................................... *F16C 9/02* (2013.01)

(58) Field of Classification Search
CPC .... F16C 9/02; F16C 9/04; F16C 17/04; F16C 17/045; F16C 17/10; F16C 17/102; F16C 33/046; F16C 33/1065; F16C 33/107; F16C 27/02; F16C 2360/22; F02F 7/0053
See application file for complete search history.

(56) References Cited

U.S. PATENT DOCUMENTS 6,149,310 A * 11/2000 Ono .......................... F16C 9/02 384/294
2018/0355907 A1* 12/2018 Sakurai ................. F16C 33/103
2019/0195272 A1* 6/2019 Amano ..................... F16C 9/02
2019/0264732 A1* 8/2019 Amano ............... F16C 33/1065

FOREIGN PATENT DOCUMENTS

DE 102016208907 A1 * 11/2017 ............. F16C 33/14
JP H11-201145 A 7/1999
JP 2013-019517 A 1/2013

OTHER PUBLICATIONS

Machine Translation of DE-102016208907-A1 (Year: 2017).*

* cited by examiner

*Primary Examiner* — Alan B Waits
(74) *Attorney, Agent, or Firm* — Harness, Dickey & Pierce, P.L.C.

(57) ABSTRACT

There is provided a half thrust bearing having a constant bearing wall thickness between a slide surface and a back surface, and including an approximately flat center region and two end regions on both circumferential sides of the center region. Each end region extends from each circumferential end of the half thrust bearing toward a circumferential center over a circumferential angle of 5° or more and 35° or less. A reference surface is defined as an imaginary plane which is perpendicular to an axial direction of the half thrust bearing, parallel to the slide surface in the center region, and located away from the slide surface. An axial distance between the slide surface and the reference surface is minimum in the center region, and continuously increases circumferentially from a center region side toward a circumferential end side at any radial position in each end regions.

5 Claims, 9 Drawing Sheets

PRIOR ART

HALF THRUST BEARING

CROSS-REFERENCE TO RELATED APPLICATIONS

This application claims the benefit and priority of JP 2023-124273, filed Jul. 31, 2023. The entire disclosure of the above application is incorporated herein by reference.

BACKGROUND OF THE INVENTION

(1) Field of the Invention

The present invention relates to a thrust bearing for receiving axial force of a crankshaft of an internal combustion engine.

(2) Description of Related Art

A crankshaft of an internal combustion engine is rotatably supported, at a journal portion thereof, by a lower portion of a cylinder block of the internal combustion engine via a main bearing configured by combining a pair of half bearings into a cylindrical shape. One or both of the pair of half bearings is used in combination with a half thrust bearing for receiving axial force of the crankshaft. The half thrust bearing(s) is arranged at one or both of axial end surfaces of the half bearing. The half thrust bearing is arranged for the purpose of receiving axial force generated in the crankshaft, i.e., for bearing axial force input to the crankshaft when the crankshaft and a transmission are connected by a clutch, or the like.

In general, a slide surface which receives axial force of a half thrust bearing and an opposite back surface thereto are parallel to a plane perpendicular to an axial direction of the half thrust bearing, and the thickness between the slide surface and the back surface is constant. Moreover, a thrust relief is formed on the slide surface side of the half thrust bearing in the vicinity of each of both circumferential ends so that the thickness of a bearing member becomes smaller toward the circumferential end. In general, the thrust relief is formed so that a thrust relief length from a circumferential end of the half thrust bearing to a slide surface and a thrust relief depth at the circumferential end are constant regardless of a radial position. The thrust relief is formed in order to absorb misalignment of end surfaces of a pair of half thrust bearings when the half thrust bearings are assembled in a divided type of bearing housing (see FIG. 10 in JP H11-201145 A).

Heretofore, it has been suggested to provide a crowning surface having a curved surface shape at least on an outer diameter side of a slide surface of a half thrust bearing in consideration of bending deformation of a crankshaft during operation of an internal combustion engine to reduce local contact stress between the slide surface of the half thrust bearing and the crankshaft (JP 2013-019517 A).

BRIEF SUMMARY OF THE INVENTION

In recent years, crankshafts have been reduced in axial diameter due to reduction in weight of an internal combustion engine, and have become lower in rigidity than conventional crankshafts. Thus, the crankshaft is apt to bend during operation of the internal combustion engine, vibration of the crankshaft tends to increase, and inclination of a thrust collar surface relative to a slide surface near a circumferential center of a half thrust bearing particularly increases. Therefore, the slide surface near the circumferential center of the half thrust bearing and the thrust collar surface of the crankshaft locally contact each other, and damage (fatigue) is apt to be caused.

Even if a crowning surface in the shape of a curved surface is provided at least on an outer diameter side of a slide surface as described in JP 2013-019517 A in order to prevent the slide surface near the circumferential center of the half thrust bearing and the thrust collar surface of the crankshaft from contacting each other, and damage (fatigue) from being caused easily, when the above-mentioned vibration resulting from the bending of the crankshaft is great, the slide surface near the circumferential center of the half thrust bearing contacts the thrust collar of the crankshaft in particular, and it is difficult to prevent the damage (fatigue).

Therefore, an object of the present invention is to provide a half thrust bearing which copes with the problem described above and in which damage (fatigue) is not easily caused during operation of an internal combustion engine.

According to one aspect of the present invention, there is provided a half thrust bearing having an approximately semi-annularly shape for receiving axial force of a crankshaft of an internal combustion engine, which half thrust bearing includes a slide surface for receiving the axial force, and back surface on an opposite side to the slide surface, and a bearing wall thickness between the slide surface and the back surface is constant.

Moreover, the half thrust bearing includes:

- an approximately flat center region including a circumferential center of the half thrust bearing, and
- two end regions on both circumferential sides of the center region, wherein each end region extends from each circumferential end of the half thrust bearing toward the circumferential center over a circumferential angle of 5° or more and 35° or less.

A reference surface is defined by an imaginary plane which is perpendicular to an axial direction of the half thrust bearing, parallel to the slide surface in the center region of the half thrust bearing, and located on the slide surface side of the half thrust bearing away from the slide surface, wherein an axial distance between the slide surface and the reference surface is minimum in the center region, and continuously increases in a circumferential direction from a center region side toward a circumferential end side at any radial position in each end region.

According to one specific embodiment of the present invention, a difference between an axial distance between the slide surface and the reference surface in the center region and an axial distance between the slide surface and the reference surface at the circumferential end is 10 to 60 μm.

Moreover, according to one specific embodiment of the present invention, two thrust reliefs are formed in the slide surface and adjacent to both circumferential ends of the half thrust bearing, respectively.

Further, according to one specific embodiment of the present invention, at least one oil groove is formed in the slide surface.

According to one specific embodiment of the present invention, the oil groove includes a groove portion extending in a radial direction of the half thrust bearing, and one or two inclined portions formed adjacent to one or both circumferential ends of the groove portion so as to extend in the radial direction, and the inclined portions are inclined so that a wall thickness of the half thrust bearing decreases from a slide surface side toward a groove portion side when viewed in a section in which the half thrust bearing is cut in the circumferential direction of the slide surface.

According to the half thrust bearing of the present invention, even if the inclined angle of a thrust collar surface of a crankshaft relative to a slide surface near a circumferential center of the half thrust bearing increases due to bending of the crankshaft during operation of an internal combustion engine, the slide surfaces near both circumferential ends of the half thrust bearing contact the thrust collar surface of the crankshaft, thereby preventing only the slide surface near the circumferential center of the half thrust bearing from contacting the thrust collar surface of the crankshaft, and making it difficult to cause damage of the slide surface of the half thrust bearing.

DETAILED DESCRIPTION OF THE INVENTION

Hereinafter, embodiments of the present invention will be described with reference to the accompanying drawings.

(Overall Configuration of Bearing Apparatus)

Figure 1:
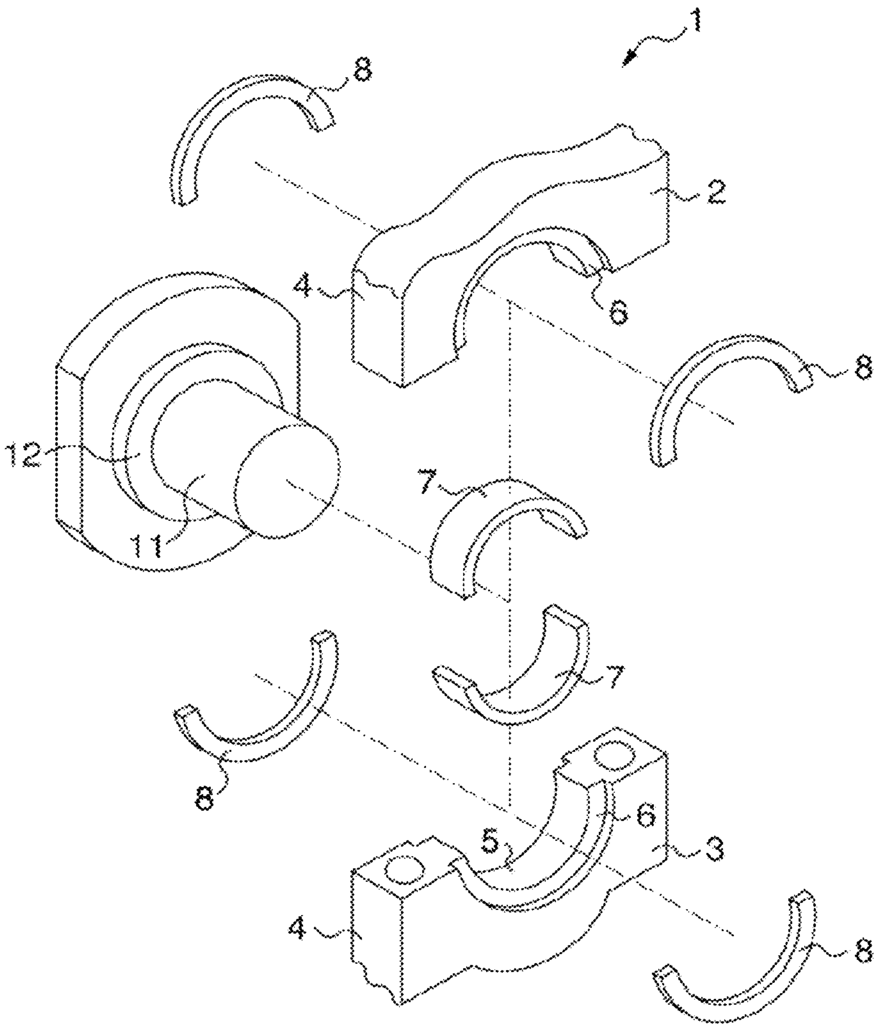
FIG. 1 is an exploded perspective view of a bearing apparatus.
Figure 2:
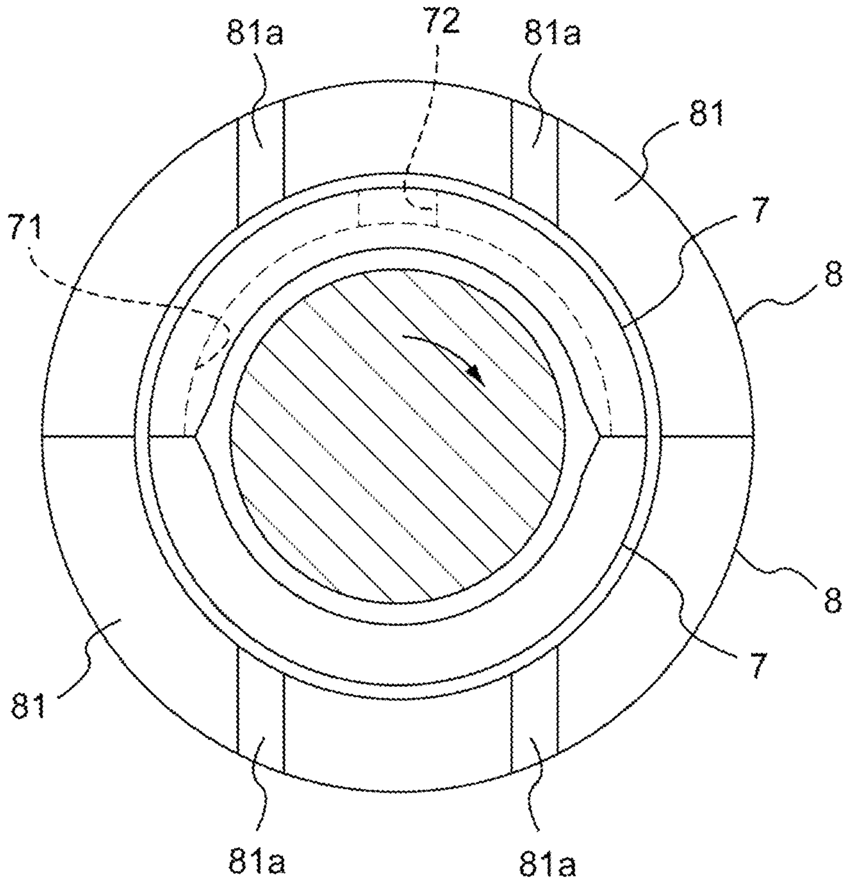
FIG. 2 is a front view of a half bearing and a thrust bearing.
Figure 3:
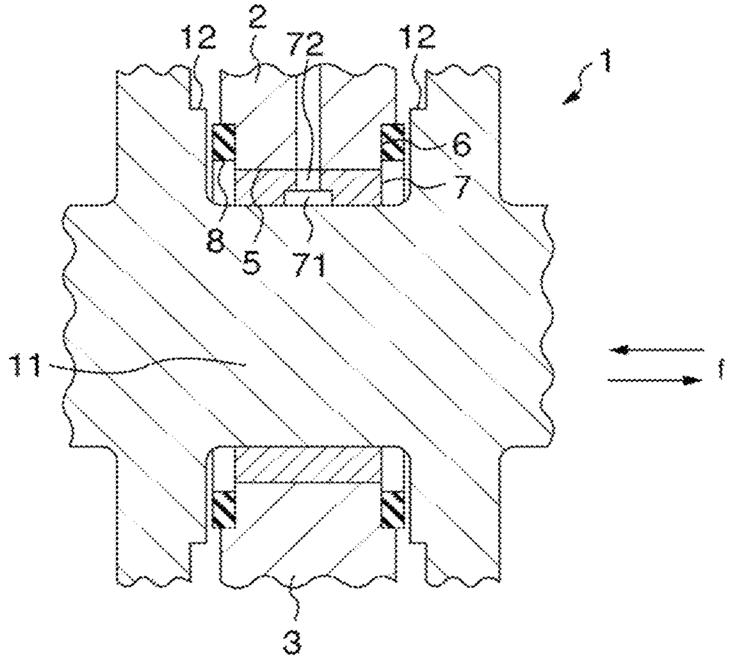
FIG. 3 is a sectional view of the bearing apparatus.

Firstly, the overall configuration of a bearing apparatus 1 is described by use of FIGS. 1 to 3. As illustrated in FIGS. 1 to 3, a bearing hole (holding hole) 5 which is a circular hole pierced between both side surfaces is formed in a bearing housing 4 configured by mounting a bearing cap 3 to a lower portion of a cylinder block 2, and receiving seats 6, 6 which are circular-ring-shaped recesses are formed on a circumferential edge of the bearing hole 5 in a side surface. Half bearings 7, 7 which rotatably support a journal portion 11 of a crankshaft are combined into a cylindrical shape and fitted into the bearing hole 5. A circumferentially extending lubricating oil groove 71 is formed in the inner circumferential surface of the half bearing 7 on the upper side (cylinder block 2 side), and lubricating oil is supplied to the lubricating oil groove 71 through a through-hole 72 formed in a bearing wall of the lubricating oil groove 71. Half thrust bearings 8, 8 which receive axial force f (see FIG. 3) via a thrust collar surface 12 of the crankshaft are combined into a circular ring shape and fitted into the receiving seats 6, 6.

Prior Art

Figure 4:
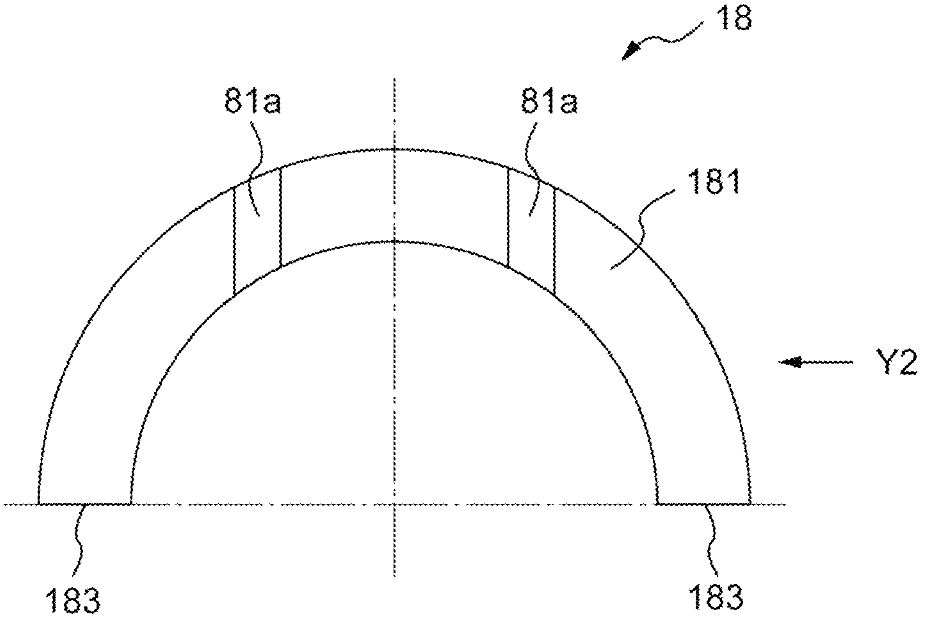
FIG. 4 is a front view of a half thrust bearing of a prior art.
Figure 5:
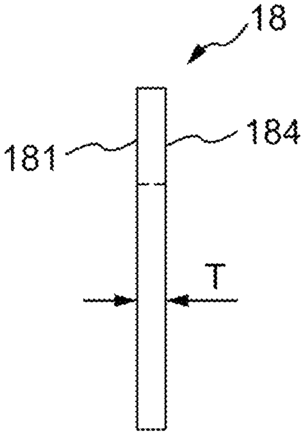
PRIOR ART FIG. 5
FIG. 5 is a side view of the half thrust bearing of the prior art in FIG. 4 viewed along arrow Y2.
Figure 6:
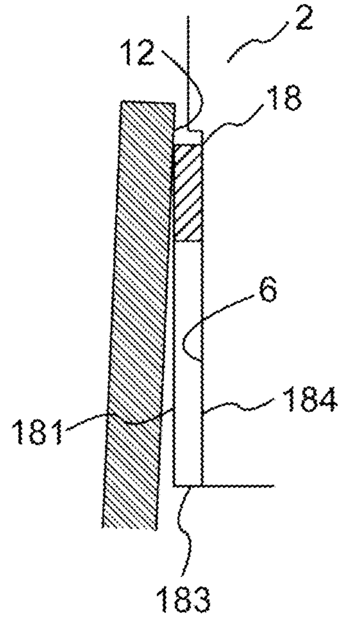
FIG. 6 is a side view for explaining actions of the half thrust bearing of the prior art.

Next, the problem of a conventional half thrust bearing 18 is described by use of FIGS. 4 to 6.

FIG. 4 illustrates a front view of the conventional half thrust bearing 18, and FIG. 5 illustrates a side view of the half thrust bearing 18 illustrated in FIG. 4 viewed along arrow Y2. A slide surface 181 and a back surface 184 of the conventional half thrust bearing 18 are planes perpendicular to the axial direction of the half thrust bearing 18, and a bearing wall thickness T between the slide surface 181 and the back surface 184 is constant.

FIG. 6 is a sectional view illustrating a condition where the tilting angle of the thrust collar surface 12 of a crankshaft relative to the slide surface 181 near a circumferential center of the conventional half thrust bearing 18 becomes increased due to the bending of the crankshaft during the operation of an internal combustion engine (the sign 183 denotes a circumferential end surface). The slide surface 181 and the back surface 184 of the conventional half thrust bearing 18 are planes perpendicular to the axial direction, and therefore the problem is that when the tilting angle of the thrust collar surface 12 of the crankshaft relative to the slide surface 181 near the circumferential center of the half thrust bearing 18 has increased, only the slide surface 181 near the circumferential center of the half thrust bearing 18 strongly contacts the thrust collar surface 12 of the crankshaft, so that damage (fatigue) is easily caused to the slide surface 181 near the circumferential center.

Embodiment 1

(Configuration of Half Thrust Bearing)

Figure 7:
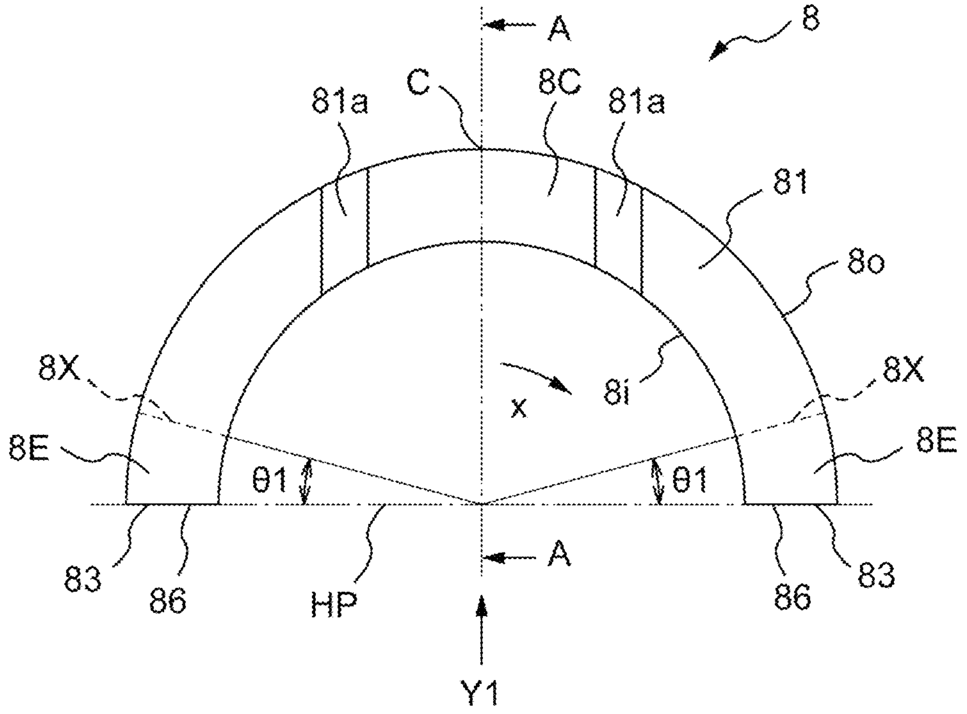
PRIOR ART FIG. 7
FIG. 7 is a front view of a half thrust bearing according to Embodiment 1.
Figure 8:
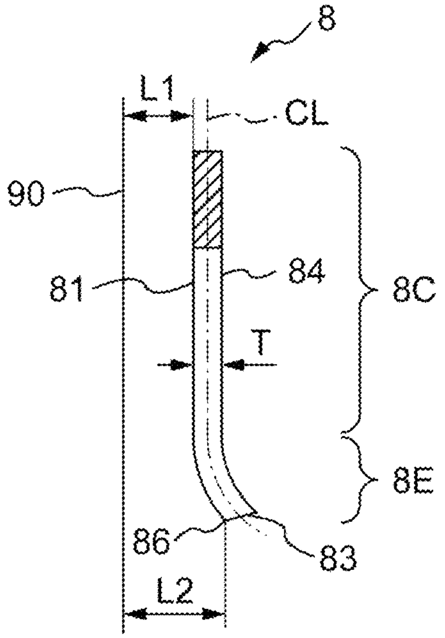
FIG. 8 is a sectional view of the half thrust bearing in FIG. 7 taken along line A-A.
Figure 9:
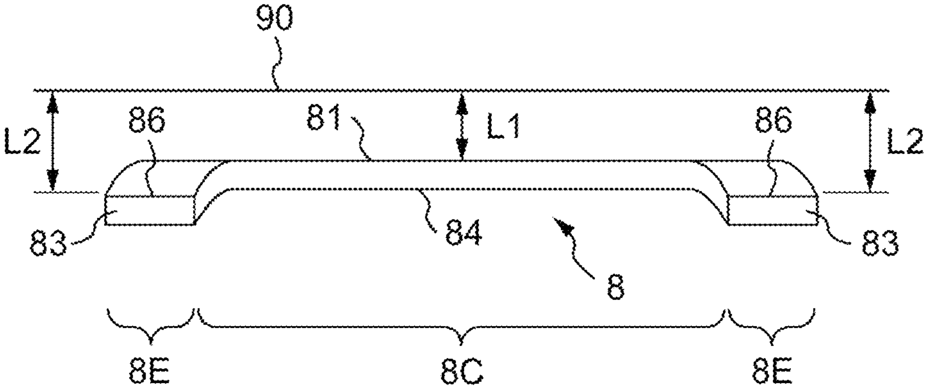
FIG. 9 is a bottom view of the half thrust bearing in FIG. 7 viewed along arrow Y1.

Next, the configuration of the half thrust bearing 8 according to Embodiment 1 of the present invention is described by use of FIGS. 7 to 11. FIG. 7 illustrates a front view of the half thrust bearing 8, FIG. 8 illustrates a sectional view of the half thrust bearing illustrated in FIG. 7 taken along line A-A, and FIG. 9 illustrates a bottom view of the half thrust bearing 8 illustrated in FIG. 7 viewed along arrow Y1. The half thrust bearing 8 according to this embodiment is formed as an approximately semi-annularly shape by a bimetal in which a thin bearing alloy layer is bonded to a steel back metal layer (the half thrust bearing 8 is curved in a direction perpendicular to the sheet of FIG. 7 as described later, and is therefore referred as being in an “approximately” semi-annularly shape). The half thrust bearing 8 includes a slide surface 81 facing in the axial direction, and the slide surface 81 is formed of a bearing alloy layer. The half thrust bearing 8 includes a back surface 84 opposite to the slide surface 81.

The slide surface 81 may include an oil groove 81*a* in order to enhance oil retaining properties of lubricating oil. Although the two oil grooves 81*a*, 81*a* are illustrated in FIGS. 7 and 2, one oil groove 81*a* or three or more oil grooves 81*a* may be formed in the slide surface 81 in contrast to this embodiment. However, when the oil groove 81*a* is formed, the "slide surface 81" in the region of the oil groove 81*a* is an imaginary plane in the case of assuming that no oil groove 81*a* exists.

The half thrust bearing 8 includes a center region 8C including a circumferential center C of the half thrust bearing 8, and two end regions 8E each extending from each circumferential end 86 of the half thrust bearing 8 toward the circumferential center C over a circumferential angle θ1 (circumferential length) of 5° or more and 35° or less. Note that, the circumferential angle θ1 of the end region 8E is constant between a radially inner end 8*i* and a radially outer end 80 in this embodiment, but is not limited thereto, and may vary and may not be constant between the radially inner end 8*i* and the radially outer end 80 (see Embodiment 2).

The slide surface 81 in the center region 8C is approximately flat (approximately planar). Each of the slide surfaces 81 in the two end regions 8E is curved convexly from the back surface 84 side toward the slide surface 81 side as a whole in the circumferential direction of the half thrust bearing 8. Here, the term "curved" means that the slide surface 81 in each of the end regions 8E has only to be curved so as to form one curved surface as a whole as illustrated in FIG. 8, and the curvature of the curved surface may circumferentially vary (the same also applies to other embodiments). In this case as well, the back surface 84 is parallel to the slide surface 81. That is to say, since the bearing wall thickness T in a direction perpendicular to the slide surface 81 between the slide surface 81 and the back surface 84 is constant, the back surface 84 in the center region 8C and the end region 8E has a shape corresponding to the slide surface. Note that, the bearing wall thickness T may be slightly vary (15 μm or less) due to, for example, working accuracy.

A reference surface 90 as a plane perpendicular to the axial direction of the half thrust bearing 8 is defined as follows: That is, the reference surface 90 is defined as an imaginary plane which is located away from the slide surface 81 so that the slide surface 81 of the half thrust bearing 8 faces the reference surface 90, wherein the slide surface 81 in the center region 8C of the half thrust bearing 8 is parallel to the reference surface 90.

Here, the axial direction is a direction perpendicular to the reference surface 90, an axis is an imaginary line extending in the axial direction through the circle center of the half thrust bearing 8, and an axial distance is a separation distance of two objects in the axial direction.

When the reference surface 90 is defined in this way, an axial distance L between the slide surface 81 and the reference surface 90 is minimum (L1) and constant in the center region 8C, and, in each of the end regions 8E, continuously increases (along the circumferential direction) (L2 at the maximum) from a position 8X of an edge adjacent to the center region 8C toward the circumferential end 86 side of the slide surface 81 at any radial position (see FIGS. 8 and 9). In this instance, the axial distance between the back surface 84 of the half thrust bearing 8 and the reference surface 90 is also minimum in the center region 8C at any radial position, and, in each of the end regions 8E, continuously increases (along the circumferential direction) from the position 8X of the edge adjacent to the center region 8C toward the circumferential end side of the back surface 84 at any radial position. Since the slide surface 81 and the back surface 84 are parallel, it is as a matter of course that a similar relationship holds true also with the back surface 84.

Specifically, in the case of use in a crankshaft of a small internal combustion engine such as a passenger vehicle (having a journal portion with a diameter of about 30 to 100 mm), a difference L3 between the axial distance L1 between the slide surface 81 and the reference surface 90 in the center region 8C of the half thrust bearing 8, and the axial distance L2 between the slide surface 81 and the reference surface 90 at the circumferential end 86 (L3=L2−L1) is, for example, 5 to 100 μm, more preferably 10 to 60 μm. If the difference L3 between the axial distances is less than 5 μm, the slide surface 81 near the circumferential end 86 no linger contacts the thrust collar surface 12 of the crankshaft when the tilting angle of the thrust collar surface 12 of the crankshaft relative to the slide surface 81 near the circumferential center C of the half thrust bearing 8 has increased, which makes it easy only for the slide surface 81 near the circumferential center C of the half thrust bearing 8 to contact the thrust collar surface 12. Moreover, if the difference L3 between the axial distances is more than 100 μm, a load applied to the slide surface 81 near the circumferential end 86 extremely increases to cause damage, when the tilting angle of the thrust collar surface 12 of the crankshaft relative to the slide surface 81 near the circumferential center C of the half thrust bearing 8 has increased. However, these dimensions are illustrative only in the above embodiment of use, and the difference L3 between the axial distances is not limited to the above dimensional ranges.

In the half thrust bearing 8 of this embodiment, the slide surface (and the corresponding back surface 84) in the center region 8C is parallel (i.e. flat) to the reference surface 90 as a whole. However, without being limited thereto, the slide surface 81 and the back surface 84 in the center region 8C may have, due to, for example, working accuracy, a curved shape slightly protruding from the back surface 84 side toward the slide surface 81 side when viewed in a radially cut section (single convex shape with a difference in height of 15 μm or less), or a curved shape slightly protruding from the slide surface 81 side toward the back surface 84 side (single convex shape with a difference in height of 15 μm or less), or may have other curved shapes. When the slide surface 81 in the center region 8C is radially curved, the condition in which the half thrust bearing 8 is arranged so that the axial distance L1 between the slide surface 81 and the reference surface 90 at the radially outer end 80 in the center region 8C, and the axial distance L1 between the slide surface 81 and the reference surface 90 at the radially inner end 8*i* in the center region 8C will be the same corresponds to the condition in which "a radial center line CL of the slide surface 81 in the center region 8C is parallel to the reference surface 90". The axial distance L1 at the radially inner end 8*i* and the radially outer end 80 of the slide surface 81 in the center region 8C in this condition of arrangement is defined as "the axial distance L1 between the slide surface 81 and the reference surface 90 in the center region 8C".

Moreover, in the half thrust bearing 8 of this embodiment, the slide surface 81 in the end region 8E (i.e. a circumferential edge) is parallel to the reference surface 90 at the circumferential end 86. However, without being limited thereto, the slide surface 81 at the circumferential end 86 (the circumferential edge) may be slightly inclined relative to the reference surface 90 (the difference of distances to the reference surface 90 is 15 μm or less) due to, for example, working accuracy. When the slide surface 81 at the circumferential end 86 (the circumferential edge) is inclined relative to the reference surface 90, the axial distance L2 is defined as an axial distance at a position at which the axial distance L from the reference surface 90 is maximum in the slide surface 81 at the circumferential end 86 (the circumferential edge).

The half thrust bearing 8 is arranged such that the back surface 84 faces the receiving seat 6 of the cylinder block 2, and the slide surface 81 receives the axial force f (see FIG. 3) via the thrust collar surface 12 of the crankshaft.

Figure 10:
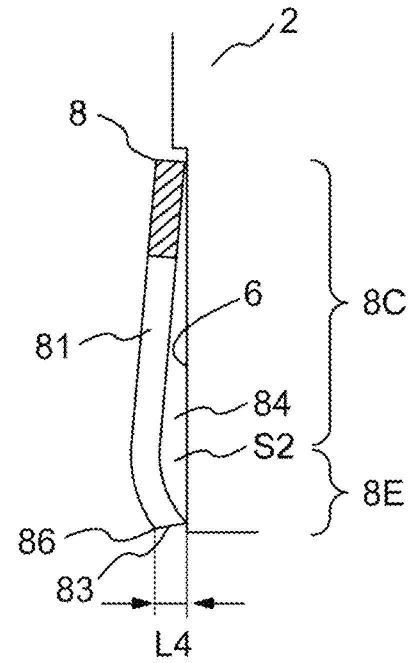
FIG. 10 is a sectional view of the half thrust bearing according to Embodiment 1 for explaining actions of the present invention.

FIG. 10 is a sectional view of the half thrust bearing 8 when the back surface 84 in the center region 8C in the circumferential center C of the half thrust bearing 8 and the back surface 84 in the end region 8E at each of the circumferential ends 86 are arranged to face the receiving seat 6 of the cylinder block 2. As illustrated in the sectional view, an axial space S2 is formed between the back surface 84 of the half thrust bearing 8 and the receiving seat 6, and the space S2 continuously increases in the center region 8C from a position contacting the receiving seat 6 in the circumferential center C toward a position (boundary between the center region 8C and the end region 8E) 8X at which the center region 8C and the end region 8E adjoin each other, and continuously increases in the end region 8E from a position contacting the receiving seat 6 near each of the circumferential ends 86 toward the position (boundary between the center region 8C and the end region 8E) 8X at which the center region 8C and the end region 8E adjoin each other. Moreover, in the slide surface 81 in the center region 8C of the half thrust bearing 8, an axial displacement amount in a direction in which the slide surface 81 faces is minimum in the circumferential center C of the half thrust bearing 8, and continuously increases toward the position (boundary between the center region 8C and the end region 8E) 8X at which the center region 8C and the end region 8E adjoin each other, and in the slide surface 81 in the end region 8E of the half thrust bearing 8, an axial displacement amount in a direction in which the slide surface 81 faces is minimum at the circumferential ends 86 of the half thrust bearing 8, and continuously increases toward the position (boundary between the center region 8C and the end region) 8X at which the center region 8C and the end region 8E adjoin each other.

Effects

Figure 11:
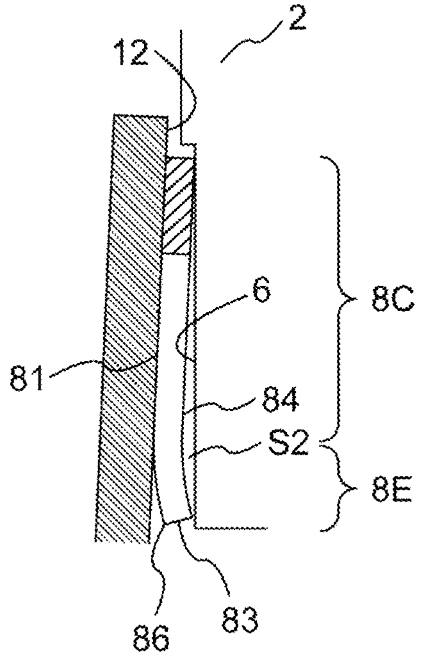
FIG. 11 is a sectional view of the half thrust bearing according to Embodiment 1 for explaining actions of the present invention.

Next, the effects of the half thrust bearing 8 according to this embodiment are described by use of FIG. 11.

FIG. 11 illustrates a condition in which the tilting angle of the thrust collar surface 12 of the crankshaft relative to the slide surface 81 near the circumferential center C of the half thrust bearing 8 has increased due to the bending of the crankshaft during the operation of an internal combustion engine. In the slide surface 81 in the center region 8C of the half thrust bearing 8, an axial displacement amount in a direction in which the slide surface 81 faces (the thrust collar surface 12 side) continuously increases toward the position (boundary between the center region 8C and the end region 8E) 8X at which the center region 8C and the end region 8E 25 adjoin each other. Thus, even when the tilting angle of the thrust collar surface 12 of the crankshaft relative to the slide surface 81 near the circumferential center C of the half thrust bearing 8 has increased, the entire slide surface 81 in the center region 8C, and the slide surface 81 in a zone of the end region 8E adjacent to the center region 8C contact the thrust collar surface 12 of the crankshaft, which therefore prevents only the slide surface 81 near the circumferential center C of the half thrust bearing 8 from contacting the thrust collar surface of the crankshaft.

Moreover, as described above, in this embodiment, the axial space S2 is formed between the back surface 84 of the half thrust bearing 8 and the receiving seat 6, and the space S2 continuously increases in the center region 8C from a position contacting the receiving seat 6 in the circumferential center C toward the position (boundary between the center region 8C and the end region 8E) 8X at which the center region 8C and the end region 8E adjoin each other, and continuously increases in the end region 8E from a position contacting the receiving seat 6 near each of the circumferential ends 86 toward the position (boundary between the center region 8C and the end region 8E) 8X at which the center region 8C and the end region 8E adjoin each other. If the slide surface 81 near the position (boundary between the center region 8C and the end region 8E) 8X at which the center region 8C and the end region 8E adjoin each other contacts the thrust collar surface 12 of the crankshaft, the half thrust bearing 8 is elastically deformed toward the space S2 side near the position (boundary between the center region 8C and the end region 8E) 8X of the half thrust bearing 8 at which the center region 8C and the end region 8E adjoin each other, and an axial displacement amount of the slide surface 81 decreases. This prevents only the slide surface 81 near the position (boundary between the center region 8C and the end region 8E) 8X at which the center region 8C and the end region 8E adjoin each other 8 from contacting the thrust collar surface 12 of the crankshaft. Therefore, in the half thrust bearing 8 according to the present invention, damage is not easily caused to the entire slide surface 81.

Embodiment 2

Figure 12:
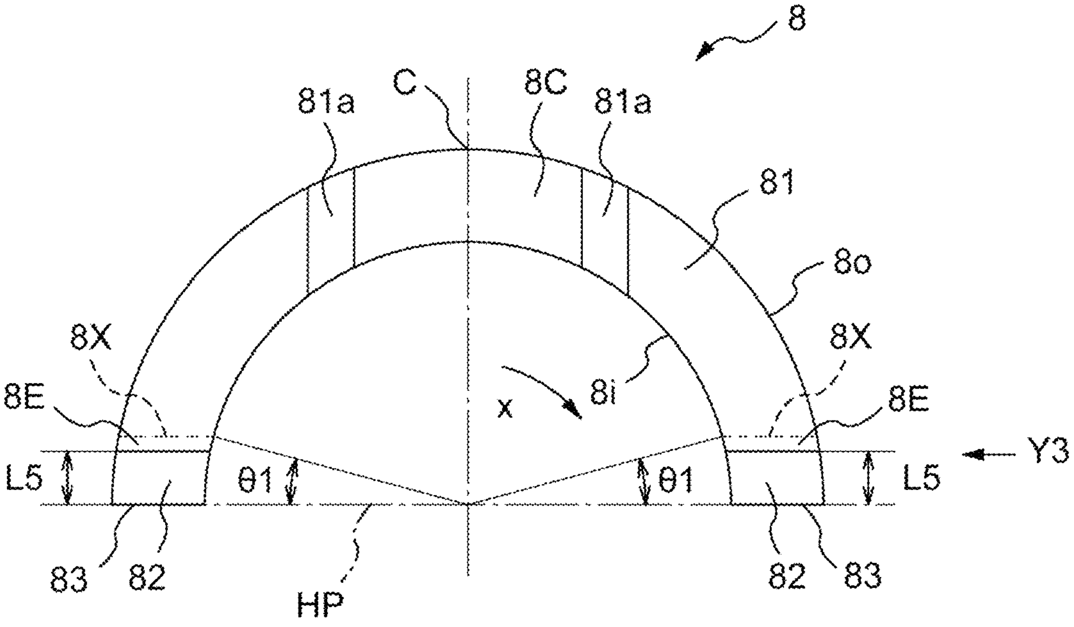
FIG. 12 is a front view of a half thrust bearing according to Embodiment 2.
Figure 13:
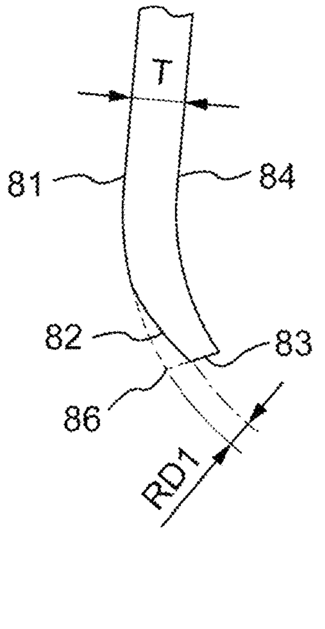
FIG. 13 is a side view of the half thrust bearing in FIG. 12 viewed along arrow Y3.

The half thrust bearing 8 in a different mode from that in Embodiment 1 is described by use of FIGS. 12 and 13. Note that, parts which are the same as or similar to those described in Embodiment 1 are described with the same reference signs.

FIG. 12 illustrates a front view in which the slide surface 81 side of the half thrust bearing 8 in Embodiment 2 is viewed, and FIG. 13 illustrates a side view of the half thrust bearing 8 in FIG. 12 viewed along arrow Y3.

Configuration

First, the configuration is described. The configuration of the half thrust bearing 8 of this embodiment is substantially similar to that in Embodiment 1 except for the configuration of the end region 8E and the configuration of thrust reliefs 82, 82.

The circumferential angle θ1 (circumferential length) of each of the end regions 8E of the half thrust bearing 8 of this embodiment varies between the radially inner end 8*i* and the radially outer end 80. Consequently, in each of the end regions 8E, the position 8X adjacent to the center region 8C is parallel to a plane (thrust bearing dividing plane HP) passing both circumferential end surfaces 83 of the half thrust bearing 8.

Moreover, the half thrust bearing 8 of this embodiment includes the thrust reliefs 82, 82 in regions adjacent to the end surfaces 83, 83 on both circumferential sides.

The thrust relief 82 is a wall thickness decreasing region formed in a region on the slide surface 81 side adjacent to the both circumferential end surfaces 83 so that the bearing wall thickness T of the half thrust bearing 8 gradually becomes smaller toward the end surface, and extends over the entire radial length of the circumferential end surface 83 of the half thrust bearing 8. The thrust relief 82 is formed to permit or absorb misalignment of the circumferential end surfaces 83, 83 of a pair of the half thrust bearings 8, 8 resulting from misalignment or the like when the half thrust bearing 8 is assembled in the divided type of bearing housing 4.

In this case, the slide surface 81 is defined as including an imaginary plane in the case of assuming that no oil groove 81*a* and thrust relief 82 exist in their parts. Therefore, the slide surface 81 in the center region 8C is approximately flat, and the slide surface 81 in the end region 8E is curved so that the slide surface 81 may be one convexly shaped curved surface as a whole protruding from the back surface 84 side toward the slide surface 81 side in the circumferential direction of the half thrust bearing 8 (FIG. 13).

As illustrated in FIG. 12, the thrust relief 82 has a constant thrust relief length L5 between the radially inner end 8*i* and the radially outer end 80 of the half thrust bearing 8.

In the case of use in a crankshaft of a small internal combustion engine such as a passenger vehicle (having a journal portion with a diameter of about 30 to 100 mm), the thrust relief length L5 from the circumferential end surface 83 of the half thrust bearing 8 is 3 to 25 μm.

Here, the thrust relief length L5 is defined as a length measured in a perpendicular direction from a plane (thrust bearing dividing plane HP) passing both circumferential end surfaces 83 of the half thrust bearing 8. Particularly, the thrust relief length L5 at the radially inner end 8*i* is defined as a length in a perpendicular direction from the circumferential end surface 83 of the half thrust bearing 8 to a point at which the thrust relief surface 82 crosses the slide surface 81.

Moreover, the thrust relief 82 of the half thrust bearing 8 can be formed so that it has, at the circumferential end surface 83, a constant depth RD1 between the radially inner end 8*i* and the radially outer end 80 of the half thrust bearing 8. The depth RD1 of the thrust relief 82 can be 0.1 to 1 mm (FIG. 13).

Here, the depth of the thrust relief 82 means a distance in a direction perpendicular to the slide surface 81 from the slide surface 81 of the half thrust bearing 8 to the surface of the thrust relief 82. In other words, the depth is a distance obtained by perpendicularly measuring from an imaginary slide surface in which the slide surface 81 is extended above the thrust relief 82 to the surface of the thrust relief 82. Therefore, the depth RD1 of the thrust relief 82 of the circumferential end surface 83 is particularly defined as a depth from the surface of the thrust relief 82 at the circumferential end surface 83 of the half thrust bearing 8 to the imaginary slide surface.

However, the dimensions of the thrust relief length L5 and the depth RD1 of the thrust relief 82 are nothing but one example, and are not limited to the above dimensional ranges. Moreover, the dimensions of the thrust relief length L5 and the depth RD1 of the thrust relief 82 may be formed so to vary between the radially inner end 8*i* and the radially outer end 80 of the half thrust bearing 8. Note that, although the thrust relief 82 is formed within the end region 8E in this embodiment, the thrust relief 82 may be formed so to include the nearby center region 8C adjacent to the end region 8E.

As described above, when the thrust relief 82 is formed, the axial distance L2 is defined as an axial distance between an imaginary slide surface and the reference surface 90 at the circumferential end 86 in the case where the thrust relief 82 is not formed.

Embodiment 3

Figure 14:
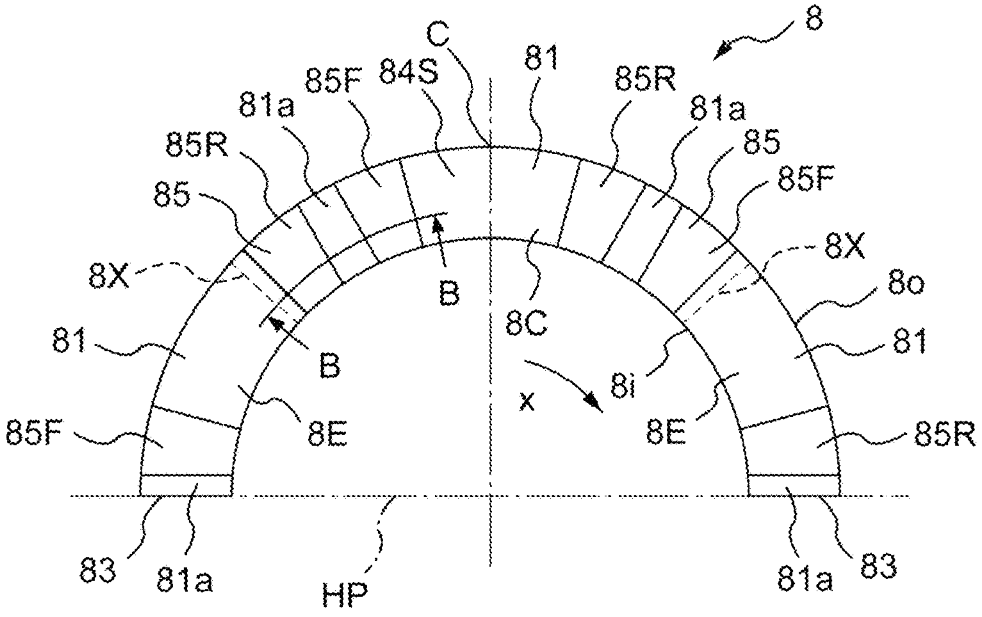
FIG. 14 is a front view of a half thrust bearing according to Embodiment 3.
Figure 15:
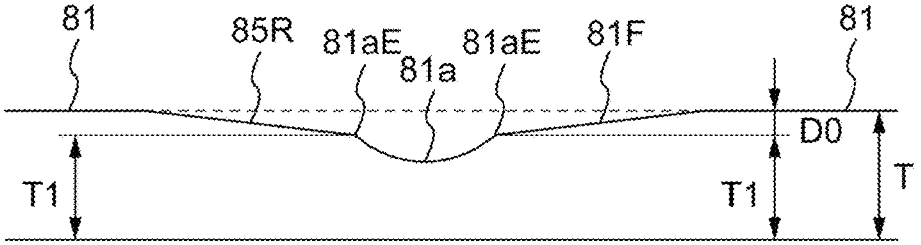
FIG. 15 is a sectional view of the half thrust bearing in FIG. 14 taken along line B-B.

The half thrust bearing 8 in a different embodiment from that in Embodiment 1 is described by use of FIGS. 14 and 15. Note that, parts which are the same as or similar to those described in Embodiment 1 are described with the same reference signs.

FIG. 14 illustrates a front view in which the slide surface 81 side of the half thrust bearing 8 in Embodiment 3 is viewed, and FIG. 15 illustrates a sectional view of the half thrust bearing 8 in FIG. 14 taken along line B-B.

Configuration

First, the configuration is described. The configuration of the half thrust bearing 8 of this embodiment is substantially similar to that in Embodiment 1 except for the configuration of the oil groove 81*a* and the configuration of inclined surfaces 85F, 85R.

In this embodiment as well, the slide surface 81 (including an imaginary plane in the case of assuming that no oil groove 81*a* and inclined surfaces 85F, 85R exist in their parts) is approximately flat in the center region 8C, and is curved in the end region 8E so as to be one convex curved surface as a whole from the back surface 84 side toward the slide surface 81 side along the circumferential direction of the half thrust bearing 8.

In order to ease the understanding of the configuration of the inclined surfaces 85F, 85R, the slide surface 81 and the back surface 84 are drawn parallel to a plane perpendicular to the axial direction of the half thrust bearing 8 in FIG. 15. The half thrust bearing 8 of this embodiment includes four oil grooves 81*a* extending (from the center of the half thrust bearing) in the radial direction on the slide surface 81 side.

The half thrust bearing 8 further includes, on the slide surface 81 side, the inclined surfaces 85F, 85R adjacent to circumferential ends 81*a*E, 81*a*E of the oil groove 81*a*. The inclined surfaces 85F, 85R are wall thickness decreasing regions formed so that the wall thickness T of the half thrust bearing 8 gradually becomes smaller from the slide surface 81 toward the circumferential ends 81*a*E, 81*a*E of the oil groove 81*a*, and becomes a minimum thickness Tl in the circumferential end 81*a*E of the oil groove 81*a*, and extend over the entire radial length of the half thrust bearing 8. The inclined surfaces 85F, 85R are formed in order to increase the pressure of oil flowing in the space between the inclined surfaces 85F, 85R and the thrust collar surface 12 during the operation of an internal combustion engine and thus increase the load capacity of the half thrust bearing 8.

A depth DO of an inclined surface defined as a length in a perpendicular direction to the slide surface 81, from the slide surface 81 to the inclined surfaces 85F, 85R at a position adjacent to the circumferential end 81*a*E of the oil groove 81*a*, can be 5 to 80 μm. A length (circumferential length) parallel to the circumferential direction of the half thrust bearing 8 of each of the inclined surfaces 85F, 85R can be a length corresponding to a circumferential angle of 5° to 25°. However, the dimensions of the depth DO of the inclined surface and the length of the inclined surface are nothing but one example, and are not limited to the above dimensional ranges.

Note that, without being limited to this embodiment, only the inclined surface 85F adjacent to the circumferential end 81*a*E on the front side of a rotation direction X (the arrow X direction in FIG. 14) of the thrust collar surface 12 of the oil groove 81*a* may be formed, and the inclined surface 85R adjacent to the circumferential end 81*a*E on the back side of the rotation direction X of the crankshaft (thrust collar surface 12) of the oil groove 81*a* may not be formed.

Moreover, when the oil groove 81*a* is formed at a position including the circumferential end 86 of the slide surface 81 in the end region 8E, the axial distance L2 is defined as an axial distance between an imaginary slide surface and the reference surface 90 in the case where the oil groove 81*a* at the circumferential end 86 is not formed.

While the embodiments according to the present invention have been described in detail above with reference to the drawings, specific configurations are not limited to these embodiments, and it should be appreciated that design changes which do not depart from the spirit of the present invention fall within the present invention.

For embodiment, the bearing apparatus 1 of a type in which the half bearing and the half thrust bearing are separated has been described in the embodiments, but the present invention is not limited thereto, and is also applicable to the bearing apparatus 1 of a type in which the half bearing and the half thrust bearing are integrated.

Figure 16:
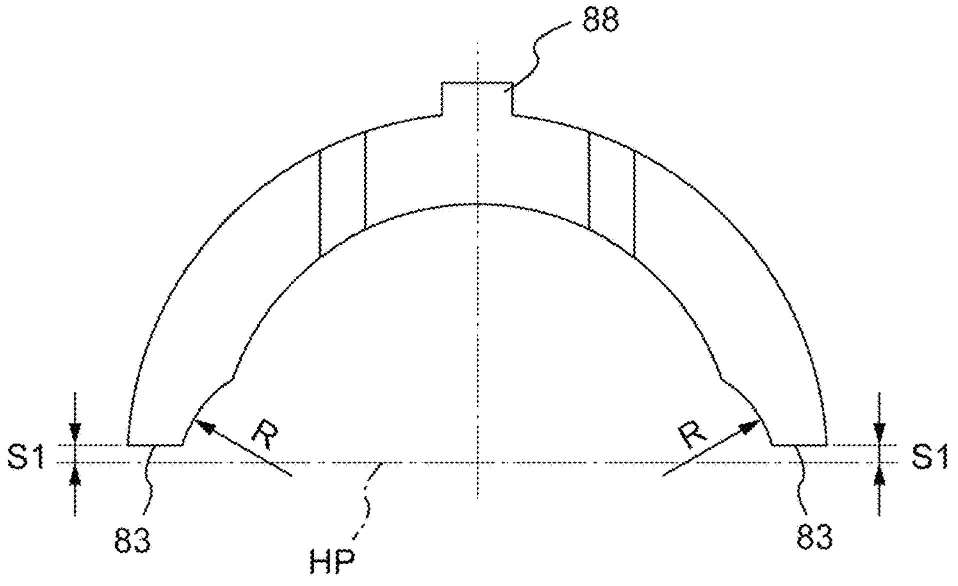
FIG. 16 is a front view of a half thrust bearing according to another embodiment of the present invention.

Moreover, as illustrated in FIG. 16, the half thrust bearing may include a protrusion 88 which radially outwardly protruded for positioning and rotation prevention. Note that, the protrusion 88 does not have to satisfy the axial distances L1 and L2 and the configuration of the bearing wall thickness T described above.

Figure 17:
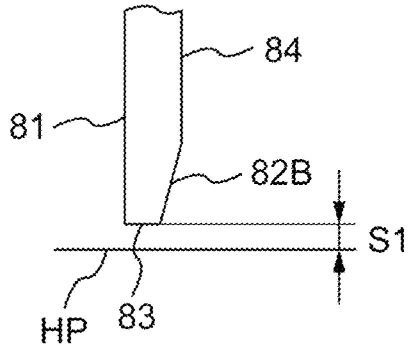
FIG. 17 is a side view of the half thrust bearing in FIG. 16 near a circumferential end.

Moreover, as illustrated in FIGS. 16 and 17, the circumferential length of the half thrust bearing may be formed shorter by a predetermined length S1 from the position (thrust bearing dividing plane HP) of the circumferential end surface of the half thrust bearing 8 shown in Embodiment 1. Further, the half thrust bearing may have its inner circumferential surface cut out in the shape of an arc with a radius R in the vicinity of both circumferential ends. Moreover, a back surface relief 82B can be formed in the back surface 84 of the half thrust bearing, and in a region adjacent to the circumferential end surface 83.

Moreover, a chamfer can be formed in (or along) the circumferential direction at the radially outer edge or radially inner edge of the slide surface of the half thrust bearing. In this case, the bearing wall thickness T of the half thrust bearing can be represented by a bearing wall thickness in the case where no chamfer is formed.

Moreover, although the above embodiments describe the case where four half thrust bearings are used in a bearing apparatus, the present invention is not limited thereto, and desired effects can be obtained by using at least one half thrust bearing according to the present invention. Moreover, in a bearing apparatus, the half thrust bearing according to the present invention may be integrally formed at one or both axial end surfaces of a half bearing which rotatably bears a crankshaft.

The invention claimed is:

1. A half thrust bearing having a semi-annular shape for receiving axial force of a crankshaft of an internal combustion engine, wherein the half thrust bearing comprises a slide surface which receives the axial force, and a back surface on an opposite side to the slide surface, a bearing wall thickness between the slide surface and the back surface being constant, the half thrust bearing comprises a flat center region including a circumferential center of the half thrust bearing, and two end regions on both circumferential sides of the center region, each end region extending from each circumferential end of the half thrust bearing toward the circumferential center over a circumferential angle of 5° or more and 35° or less, and a reference surface is defined by an imaginary plane which is perpendicular to an axial direction of the half thrust bearing, parallel to the slide surface in the center region of the half thrust bearing and located on a slide surface side of the half thrust bearing away from the slide surface, wherein an axial distance between the slide surface and the reference surface is minimum in the center region, and continuously increases in a circumferential direction from a center region side toward a circumferential end side at any radial position in each end region.

2. The half thrust bearing according to claim 1, wherein a difference between an axial distance between the slide surface and the reference surface in the center region, and an axial distance between the slide surface and the reference surface at the circumferential end is 10 to 60 μm.

3. The half thrust bearing according to claim 1, further comprising two thrust reliefs formed adjacent to the slide surface and adjacent to the circumferential ends of the half thrust bearing, respectively.

4. The half thrust bearing according to claim 1, further comprising at least one oil groove formed adjacent to the slide surface.

5. The half thrust bearing according to claim 4, wherein the oil groove comprises a groove portion extending in a radial direction of the half thrust bearing, and one or two inclined portions formed adjacent to one or both circumferential ends of the groove portion so as to extend in the radial direction, and the inclined portions are inclined so that a wall thickness of the half thrust bearing decreases from a slide surface side toward a groove portion side viewed in a section along a circumferential direction of the half thrust bearing.

* * * * *